(12) United States Patent
Thusoo et al.

(10) Patent No.: US 6,775,756 B1
(45) Date of Patent: Aug. 10, 2004

(54) METHOD AND APPARATUS FOR OUT OF ORDER MEMORY PROCESSING WITHIN AN IN ORDER PROCESSOR

(75) Inventors: Shalesh Thusoo, Milpitas, CA (US); Niteen Patkar, Sunnyvale, CA (US); Jim Lin, Sunnyvale, CA (US)

(73) Assignee: ATI International Srl, Barbados (KN)

( * ) Notice: Subject to any disclaimer, the term of this patent is extended or adjusted under 35 U.S.C. 154(b) by 0 days.

(21) Appl. No.: 09/416,196

(22) Filed: Oct. 11, 1999

(51) Int. Cl.$^7$ .......................... G06F 12/00; G06F 9/38; G06F 9/34
(52) U.S. Cl. ...................... 711/169; 711/140; 711/215; 711/214; 712/219
(58) Field of Search ................................. 711/140, 169, 711/138, 201, 210, 214–215; 712/216–218, 219, 225, 204; 708/233

(56) References Cited

U.S. PATENT DOCUMENTS

| | | | | |
|---|---|---|---|---|
| 5,455,924 A | * | 10/1995 | Shenoy et al. | 711/118 |
| 5,526,510 A | * | 6/1996 | Akkary et al. | 711/133 |
| 5,784,588 A | * | 7/1998 | Leung | 712/216 |
| 6,185,660 B1 | * | 2/2001 | Mulla et al. | 711/140 |
| 6,473,837 B1 | * | 10/2002 | Hughes et al. | 711/146 |

* cited by examiner

Primary Examiner—Denise Tran
(74) Attorney, Agent, or Firm—Vedder, Price, Kaufman & Kammholz, P.C.

(57) ABSTRACT

A method and apparatus for out-of-order memory processing within an in-order processing device includes processing that allows a plurality of memory transactions to be processed in a pipeline manner until a dependency arises between two or more memory transactions. Such processing includes, for each of the plurality of memory transactions, determining whether data associated with the transaction is stored in local cache. If the data is stored in local cache, it is written into a data register in a next pipeline interval. The processing continues by storing the memory transaction in a miss buffer when the data associated with the memory transaction is not stored in the local cache. The processing continues by writing the associated data for the memory transaction identified in the missed buffer into the data register when the data is received without regard to the pipeline manner.

16 Claims, 9 Drawing Sheets

METHOD AND APPARATUS FOR OUT OF ORDER MEMORY PROCESSING WITHIN AN IN ORDER PROCESSOR

TECHNICAL FIELD OF THE INVENTION

This invention relates generally to computers and more particularly to memory processing within a processor of a computer.

BACKGROUND OF THE INVENTION

Computers are known to include a central processing unit (CPU), system memory, video graphics processing circuitry, audio processing circuitry, and input/output (I/O) ports. The I/O ports enable the computer to interface with peripheral devices such as monitors, keyboards, mouses, printers, the Internet, local area networks, etc. The computer components work in concert to provide a user with a very powerful tool. In general, the system memory stores applications (e.g., word processing, spread sheets, drawing packages, web browsers) that are executed by the central processing unit and supporting by the co-processing elements (e.g., the video graphics and audio processing circuits).

As one would appreciate, the efficiency of the central processing unit, while processing applications and system level operations (e.g., power management, screen saver, system level interrupts, etc.), effect the overall efficiency of the computer. Accordingly, the architectural design of the central processing unit is critical and is continually being improved. Currently, the architecture of the central processing unit includes an instruction cache, a fetch module, an instruction decoder, an instruction issuance module, an arithmetic logic unit (ALU), a load store module, and a data cache. The instruction cache and data cache are used to temporarily store instructions and data, respectively. Once the instruction is cached, a fetch module retrieves it and provides it to the decoder. Alternatively, the fetch module may retrieve an instruction directly from main memory and provide it to the decoder, while simultaneously storing the instruction in the instruction cache.

The decoder decodes the instruction into microcode and, via the instruction issuance module, provides it to the ALU. The ALU includes an address calculation module, a plurality of integer operation modules, a plurality of integer operation modules, a plurality of floating point modules, and a plurality of multi-media operation modules to perform a plurality of operations. The integer modules may include two arithmetic/logic modules, shift modules, one multiply module and one divide module. The floating point modules include a floating point adder and a floating point multiplier. The multimedia module includes two multi-media arithmetic and logic modules, one multi-media shift module and one multi-media multiplier.

The elements of the CPU are operably coupled together via a CPU internal pipeline, which enhances the CPUs performance of transactions (e.g., read and/or write data operational codes, instruction operational codes, etc.). As such, multiple transactions are on the bus at any given time and proceed without issue unless a transaction encounters a miss (i.e., the data, or instruction being sought is not in the local data or instruction cache). When this occurs, the pipeline process stops for all transactions until the data or instruction needed is locally stored. Such stoppage, or stalling, of the pipeline process causes delays, which negatively impact the CPU's efficiency.

Therefore, a need exists for a CPU pipelining process that minimizes stalling.

DETAILED DESCRIPTION OF A PREFERRED EMBODIMENT

Generally, the present invention provides a method and apparatus for out-of-order memory processing within an in-order processing device. Such a method and apparatus includes processing that allows a plurality of memory transactions to be processed in a pipeline manner until a dependency arises between two or more memory, and/or non-memory, transactions. Such processing includes, for each of the plurality of memory transactions, determining whether data (e.g., data or an instruction) associated with the transaction is stored in local cache (e.g., data cache or instruction cache). If the data is stored in local cache, it is written into a data register in a next pipeline interval. The processing continues by storing the memory transaction in a miss buffer when the data associated with the memory transaction is not stored in the local cache. The processing continues by writing the associated data for the memory transaction identified in the missed buffer into the data register when the data is received without regard to the pipeline manner, i.e., allows for out of order processing within the in order processor. As such, an individual transaction may be stalled while the remaining transactions proceed in the pipeline fashion until a dependency arises between transactions. Thus, a central processing unit incorporating such a method and apparatus will be more efficient since its pipeline process will only be stalled when there is a dependency between two transactions and not just a miss for one transaction as in prior art processes.

Figure 1:
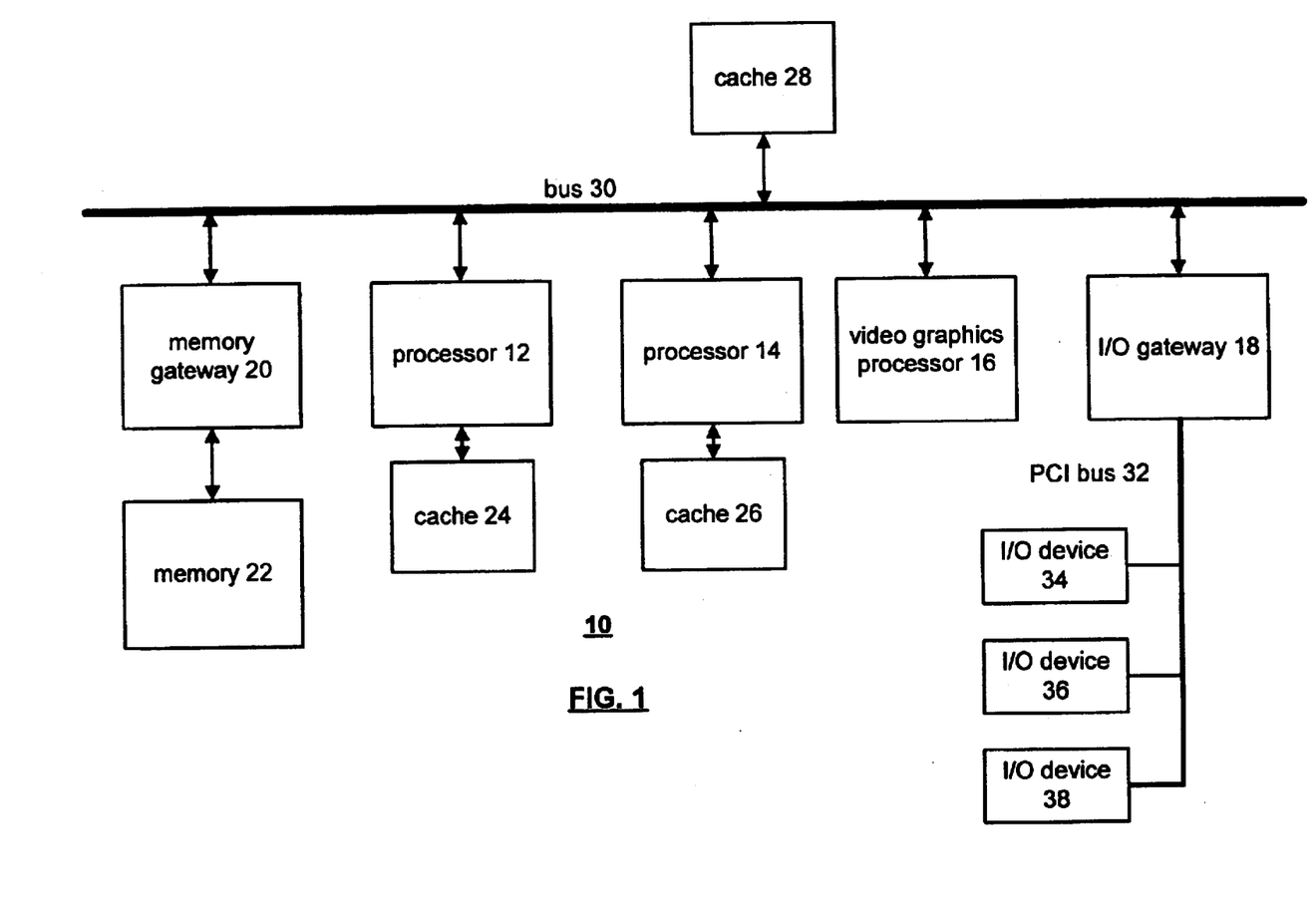
FIG. 1 illustrates a schematic block diagram of a computing system in accordance with the present invention.

The present invention can be more fully described with reference to FIGS. 1 through 10. FIG. 1 illustrates a schematic block diagram of a computing system 10 that includes a plurality of processors 12 and 14, a video graphics processor 16, an I/O gateway 18, a memory gateway 20, a bus 30, and cache memory 28. The memory gateway 20 is operably coupled to a memory 22 and the I/O gateway 18 is coupled to a plurality of I/O devices 34–38 via a PCI bus 32. The computing system 10 is also shown to include cache memory 24 and 26 operably coupled to processors 12 and 14. In various embodiments of computing system 10, the system may only include cache memory 28, include only cache memories 24 and 26 or include all three caches 24, 26 and 28. For a more detailed discussion of sharing cache in such a computing system 10 refer to co-pending patent application entitled "Method and Apparatus for Sharing Cache Memory" having an attorney document number of 0100.9900700, a serial number of Ser. No. 09/328,844 and a filing date of Jun. 9, 1999 now abandoned.

The computing system 10 may be implemented as an integrated circuit wherein the bus is a low latency high-band width data bus. In one embodiment, the bus 30 may include a 256 data bit line and operate at 500 megahertz. For a detailed discussion of the functionality of bus 30, refer to co-pending patent application entitled "Method and Apparatus for Busing Data Elements" having an attorney document number of 0100.9900710, a serial number of Ser. No. 09/328,971 and a filing date of Jun. 9, 1999 now U.S. Pat. No. 6,449,671. In general, the transaction placed on bus 30 utilize the physical address space of the computing system.

The I/O devices 34–38 may be sound cards, television encoder cards, MPEG decoders/encoders (e.g., digital satellite transceivers), a display (e.g., an LCD display, CRT monitor), and/or any peripheral computer device that interfaces with the computing system 10 via the PCI bus 32.

Figure 2:
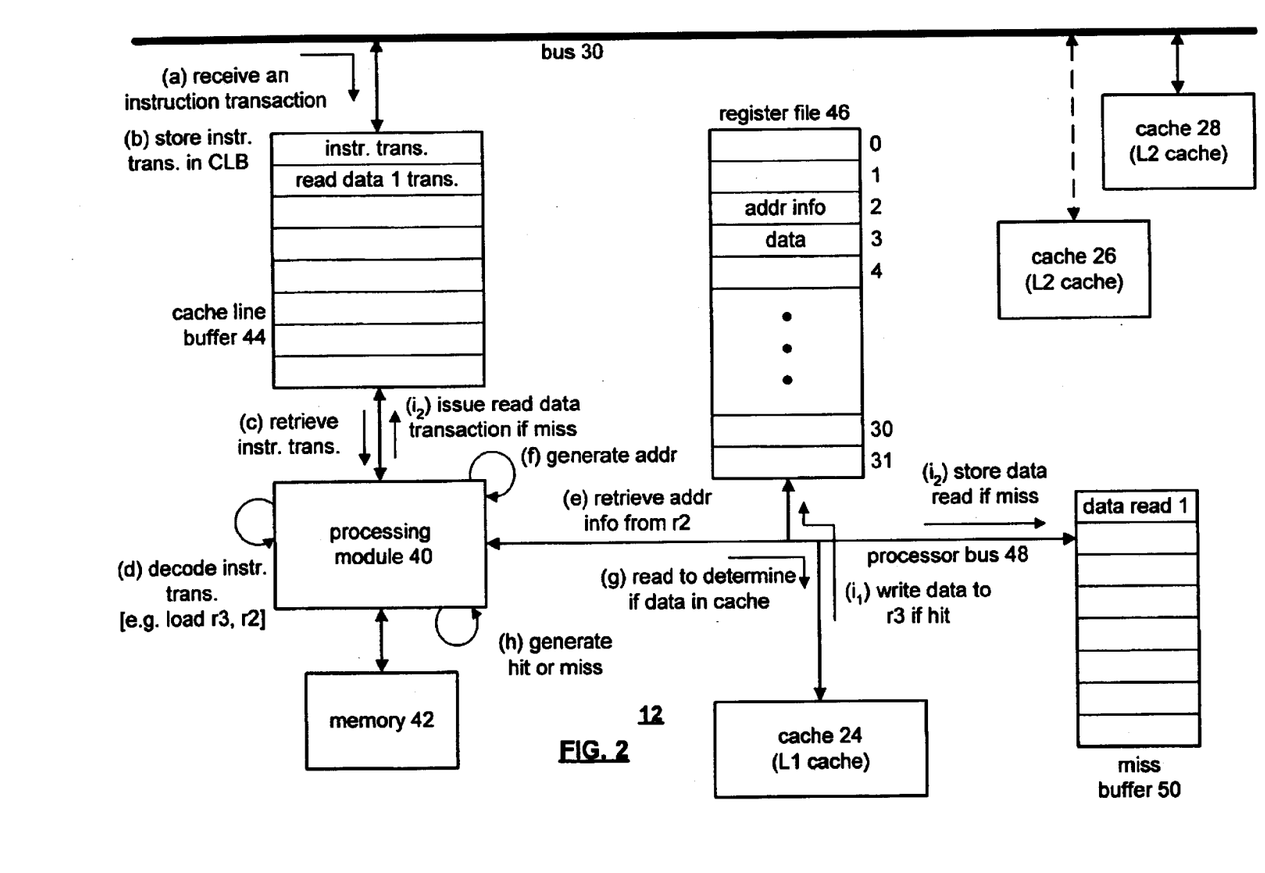
FIG. 2 illustrates a schematic block diagram and operational diagram of a central processing unit in accordance with the present invention.

FIG. 2 illustrates a schematic block diagram of a portion of the central processing unit 12, or 14, and an operational flow for out-of-order memory processing within an in-order processing device. The central processing unit 12, or 14, includes a processing module 40, memory 42, a cache line buffer 44, a register file 46, a processor bus 48, and a miss bus 50. The central processing unit 12 is also coupled to local cache 24 (i.e., L1 cache), the system level bus 30, which enables the central processing unit 12 to be coupled to caches 26 and/or 28 (i.e., L2 cache), and the system memory. The processing module 40 may be a single processing device or a plurality of processing devices. Such a processing device may be a microprocessor, microcontroller, digital signal processor, microcomputer, state machine, logic circuitry, and/or any device that manipulates signals (e.g., analog and/or digital) based on operational instructions. The memory 42 may be a single memory device or a plurality of memory devices. Such a memory device may be a random access memory, reprogrammable memory, flash memory, hard drive memory, system memory, and/or any device that stores digital information. Further note that the processing module 40 and memory 42 may be inclusive of other components of a central processing unit, such as the arithmetic logic unit, etc. For a more detailed discussion of an arithmetic logic unit that may be incorporated herein refer to co-pending patent application having a docket number of 0100.9900930 entitled "Method and Apparatus of Configurable Processing," having a serial number of Ser. No. 09/376,830 and a filing date of Aug. 18, 1999, which is assigned to the same assignee as the present invention.

The cache line buffer 44 is operably coupled to the bus 30 and the processing module 40. The cache line buffer 44 acts as an interface for the central processing unit 12 with the rest of the computing system via the bus 30. Accordingly, the cache line buffer 44 stores incoming memory transactions and outgoing memory transactions. Incoming memory transactions include instruction transactions (e.g., requesting the central processing unit to perform a particular function such as read data, write data, load data, etc.), and data transactions (e.g., retrieve data from local cache, manipulate data, etc.). For a more detailed discussion of the operations of the cache line buffer 44 refer to co-pending patent application having a docket number of 0100.990095 entitled "A Method and Apparatus for Interfacing a Processor With a Bus," having a Ser. No. 09/377,004 filed on Aug. 8, 1999 and issued as U.S. Pat. No. 6,430,646 on Aug. 6, 2002, and is assigned to the same assignee as the present invention.

The register file 46 is shown to include 32 entries for storing address information, data and/or instruction information. As one of average skill in the art would readily appreciate, the number of locations within the register file 46 may vary from 32. The miss buffer 50 includes a plurality of locations for storing transactions wherein the requesting information is not stored local cache. As such, these transactions are identified within the miss buffer until the corresponding information, data, addressing information, and/or instructions have been retrieved from the L2 caches, or system memory.

In operation, the central processing unit 12 receives, at step (a), an instruction transaction. At step (b), the instruction transaction is stored in the cache line buffer 44. Next, the processing module 40 retrieves the instruction transaction and decodes it (steps c and d). For example, the decoded instruction may be -load R3, R2-, which is interpreted to mean obtain address information from R2, use the corresponding address to retrieve data and store the retrieved data at R3. Accordingly, R2 is the second location in the register file 46 and contains addressing information, while R3 is the third location in the register file 46 and corresponds to the targeted register for storing the retrieved data.

Having decoded the instruction transaction, the processing module 40 retrieves the address information from register 2 (step e). The processing module 40 then generates an address from the addressing information (step f). For example, the addressing information may be in virtual address memory space such that the processing module 40 must convert it into a physical memory space address to retrieve data. Having generated the address, the processing module 40 then reads from the cache 24 to determine if the data is in the cache (step g). Note that for the purposes of discussion a memory transaction includes one or both of instruction transactions and data transactions, the term "data" refers to one or both of data and instructions, and local cache refers to data cache and/or instruction cache. As such, for convenience of discussion only memory data transactions and the corresponding data will be discussed.

The processing module 40 generates a hit message if the data is stored in local cache and generates a miss message if not stored in local cache 24 (step h). If the data is stored in local cache, the data is written into the register file 46 at register location 3 (step $i_1$). If, however, the data is not stored in local cache, the transaction is stored in the miss buffer 50 and the processing module 40 issues a read data transaction request (step $i_2$)The read data transaction request is provided to the cache line buffer and stored therein. The processing of transactions within the cache line buffer 44 are discussed in the previously mentioned co-pending patent application. Once the transaction is stored in the miss buffer, this particular transaction is stalled until the data is received, but the remaining transactions on the bus are not stalled. As such, the out of order processing is achieved because subsequent transactions will be completed, when the data is in local cache, than transactions stored in the miss buffer.

When the read data transaction is fulfilled (i.e., the data is retrieved from L2 cache or system memory), the retrieved data is written into the register file 46 at register location 3. Having done this, the transaction is deleted from the miss buffer 50. By utilizing the functionality of the central processing unit 12 as described, a plurality of memory transactions may be processed in a pipeline manner where, if one transaction is stalled, other transactions are not stalled. As such, in the process previously described, when a miss occurs, the pipeline process continues for other transactions while in prior art embodiments the pipelining process would be stalled.

Figure 3:
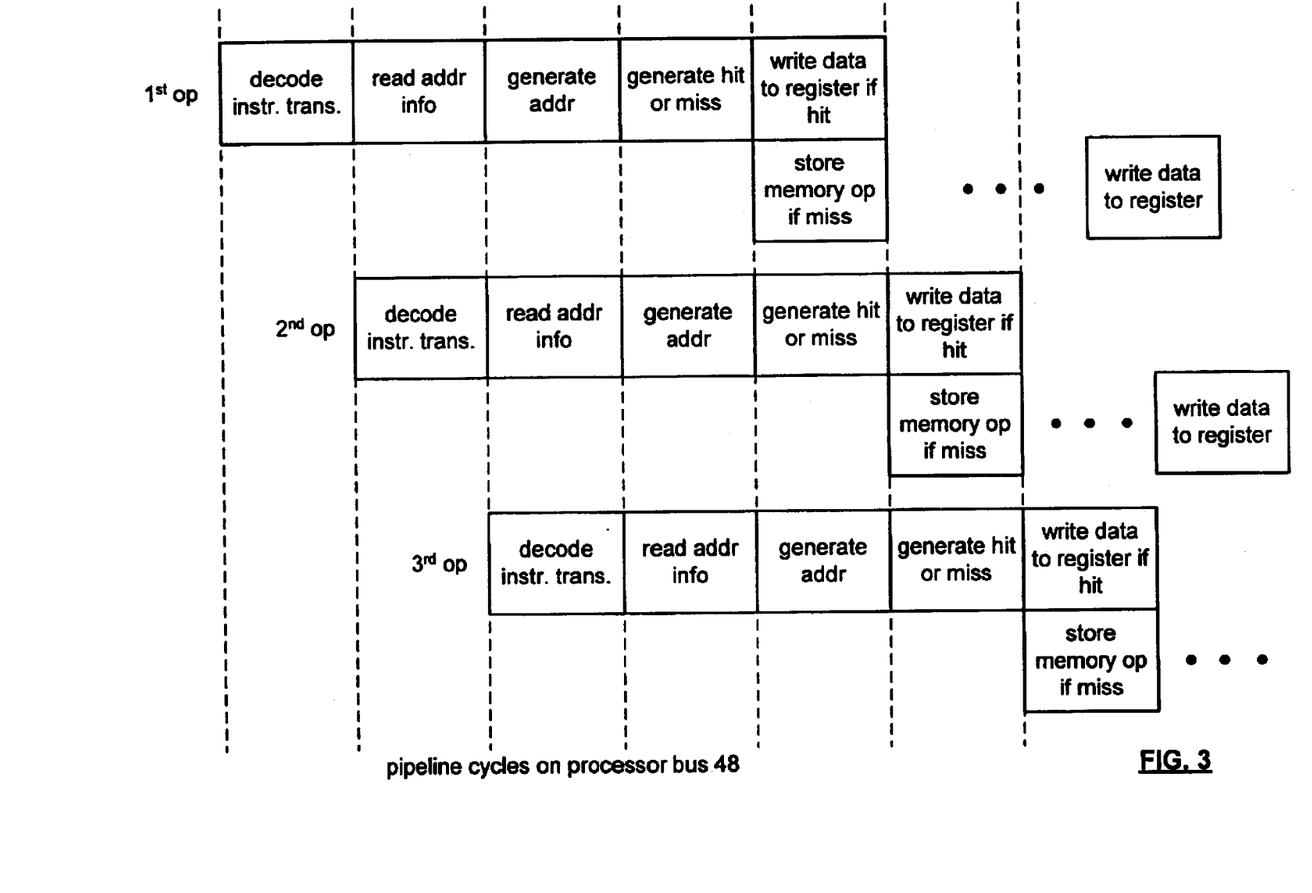
FIG. 3 illustrates a graphical representation of a pipelining process in accordance with the present invention.

FIG. 3 illustrates a graphical diagram of the pipeline process in accordance with the present invention. In this illustration, three transactions occur designated by first op, second op and third op. The dash lines correspond to pipeline cycles where a pipeline cycle may be a single clock cycle or a plurality of clock cycles. The various phases of the pipeline operation include decode transaction, read addressing information, generate address, generate a hit or miss message, write data to the register if a hit or store the memory operation if a miss. At some later pipeline cycle, for a miss transaction, the data will be written into the register. As shown, the decode phase for the plurality of transactions occur one cycle after the next thereby forming the pipeline operation.

Figure 4:
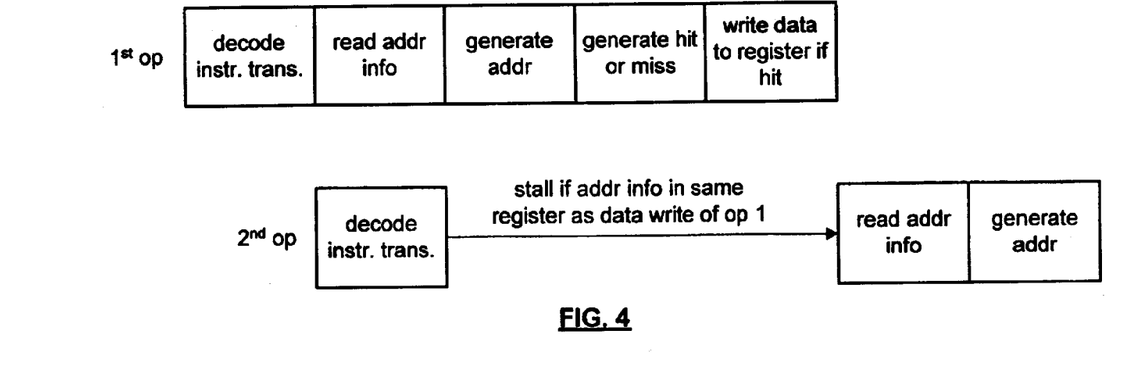
FIG. 4 illustrates a graphical representation of one transaction being stalled when an address register is unavailable in accordance with the present invention.

FIG. 4 illustrates an example of when the second transaction is stalled. In this example, once the instruction has been decoded, the second transaction is stalled when the address information is in the same register as the data write operation of the first transaction. As such the second transaction, and subsequent transactions, would be stalled until the register becomes available. Once the register becomes available, the second transaction and the subsequent transactions proceed.

Figure 5:
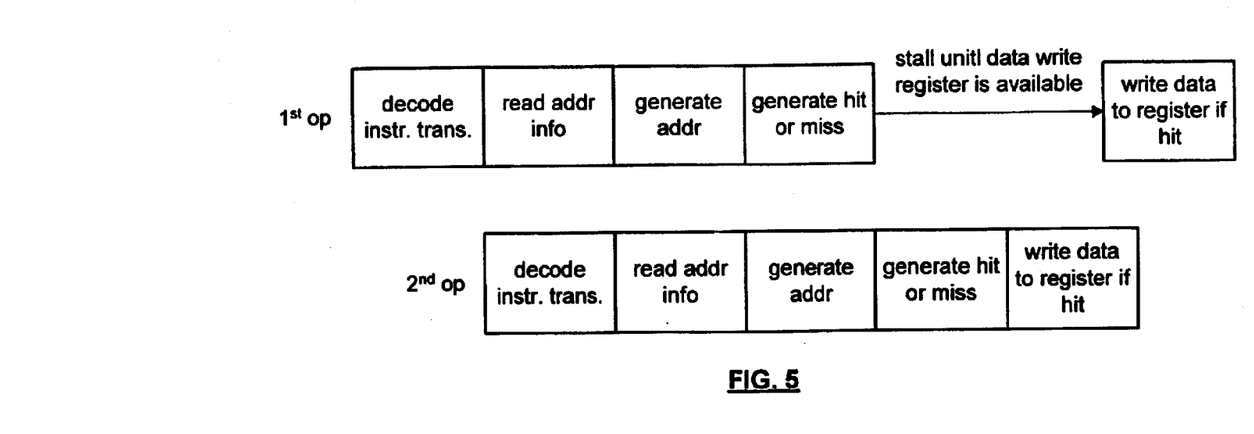
FIG. 5 illustrates a graphical representation of a single transaction being stalled when a write register is unavailable in accordance with the present invention.

FIG. 5 illustrates an example of when the first transaction is stalled due to the data write register being unavailable. In this illustration, the first transaction is interrupted, or stalled, because the data write register is unavailable. As shown, the second transaction proceeds such that the writing of the data into the register for the first and second transactions occur without regard to the pipeline process. As such, by allowing the out-of-order processing of data into the data registers of the register file, the chance for stalling the entire pipeline are substantially reduced. By reducing the stalling of the pipeline, the overall efficiency of the central processing unit is improved. Alternatively, when the first transaction is stalled due to a dependency with a preceding transaction, the subsequent transactions may be stalled until the dependency is eliminated.

Figure 6:
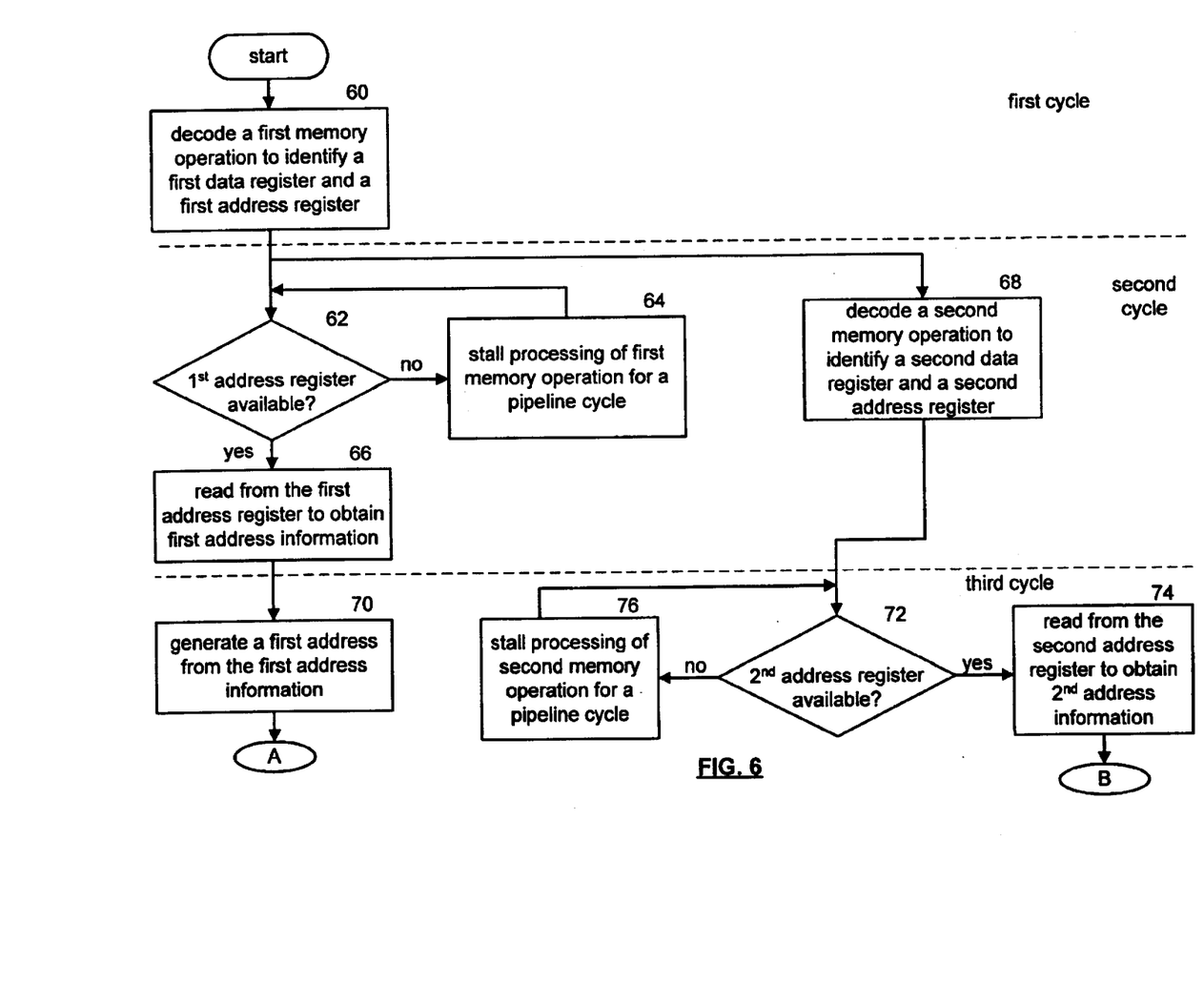
FIGS. 6 through 8 illustrate a logic diagram of a method of an out-of-order memory processing within an in-order processing device in accordance with the present invention.
Figure 7:
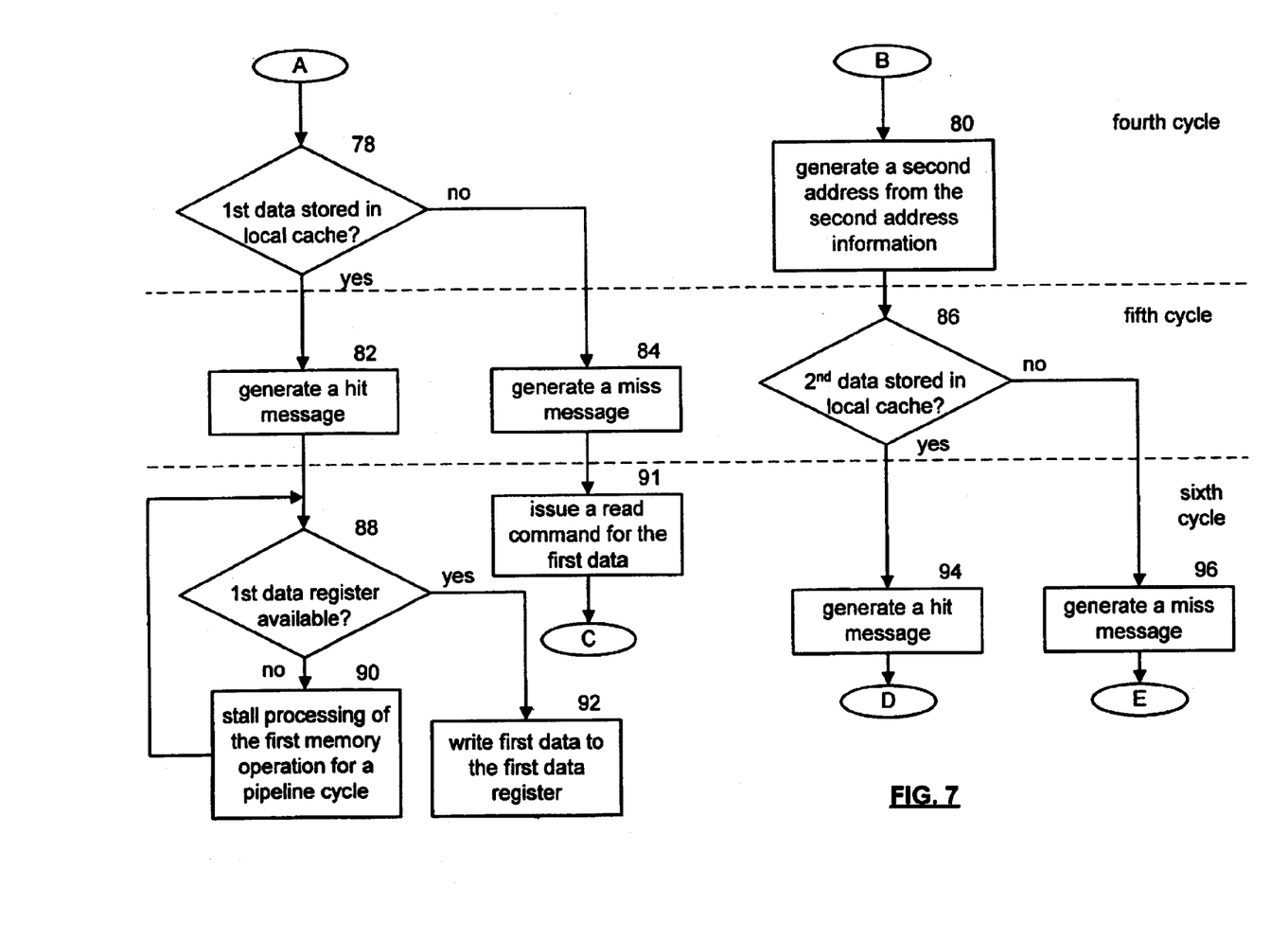
Figure 8:
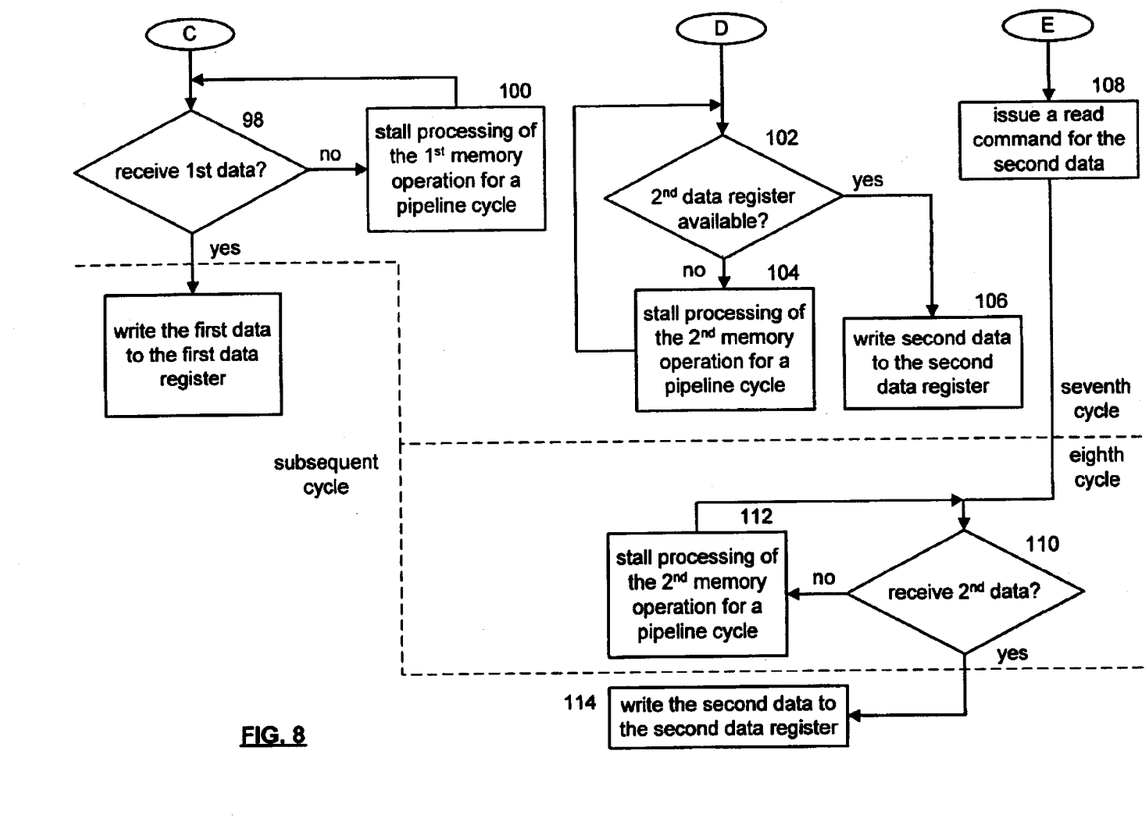

FIGS. 6 through 8 illustrate a logic diagram of a method for out-of-order memory processing within an in-order processing device. The process begins at step 60 where a first memory operation is decoded to identify a first data register and a first address register. This step occurs in a first cycle of the pipeline process. The process then proceeds to step 62 where a determination is made as to whether the first address register is available. If not, the process proceeds to step 64 where the processing of the first memory operation is stalled for a pipeline cycle. Note that a memory operation includes a memory data transaction and/or a memory instruction transaction. The processing of step 62 and 64 will continue on a cycle by cycle basis until the first address register becomes available. When the first address register becomes available, the process proceeds to step 66 where the first address information is obtained by reading the information from the first address register.

In parallel with the processing of step 62 through 64, the processing also decodes, at step 68, a second memory operation to identify a second data register and a second address register. The processing of step 68 and step 62 through 64 occur within a second cycle of the pipeline process. Note that the stalling of the first transaction may not affect the processing of the second transaction unless the second transaction is dependent upon the first. As such, if step 64 is performed for the first transaction, the second transaction would continue its processing, i.e., proceed to the subsequent steps in subsequent pipeline cycles. Alternatively, when the first transaction is stalled due to a dependency with a preceding transaction, the subsequent transactions may be stalled until the dependency is eliminated.

For the first memory operation, the process proceeds from step 66 to step 70. At step 70 a first address is generated from the first address information. For example, the first address information may be an address that is contained within the virtual, or linear address space of the central processing unit. The generation of the first address may entail a conversion from virtual address space to physical address space to obtain the first address.

For the second memory operation, the process proceeds from step 68 to step 72. At step 72, a determination is made as to whether the second address register is available. If not, the process proceeds to step 76 where the processing of the second memory operation is stalled for a pipeline cycle. The per pipeline cycle stalling continues until the second address register becomes available. When the second address register is available, the process proceeds to step 74 where the second address information is obtained by reading it from the second address register. The processing of steps 70 and steps 72 through 74 occur during a third pipeline cycle.

For the first memory operation, the process proceeds to step 78, which is shown on FIG. 7. At step 78, a determination is made as to whether the first data is stored in the local cache. The result of the determination of step 78 is processed in a subsequent cycle, which will be discussed below. For the second memory transaction, the process proceeds from step 74 to step 80, which is shown on FIG. 7. At step 80, a second address is generated from the second address information. The processing of steps 78 and 80 occur during a fourth pipeline cycle.

For the first memory operation, a hit message is generated at step 82 when the first data is stored in the local cache. If the first data is not stored in the local cache, the process proceeds to step 84 where a miss message is generated. For the second memory operation, the process proceeds to step 86. At step 86 a determination is made as to whether the second data is stored in local cache. The processing of steps 82 through 86 occur during a fifth pipeline cycle.

For the first memory operation, when a hit message was generated, the process proceeds to step 88. At step 88, a determination is made as to whether the first data register is available. If not, the process proceeds to step 90 where processing of the first memory operation is stalled for a pipeline cycle. The stalling, on a per pipeline cycle, occurs until the first data register is available. If the data register is available, the process proceeds to step 92 where the first data is written into the first data register. At step 92, the process is complete for the first memory operation. If a miss message was generated at step 84, the process proceeds to step 91 where a read command is issued for the first data.

For the second memory operation, a hit message is generated at step 94 when the second data is stored in the local cache. If the second data is not stored in the local cache, a miss message is generated at step 96. The processing of steps 88 through 92 and the processing of steps 94 or 96 occur during a sixth pipeline cycle.

The process then proceeds for the first operation if a read command has been issued to step 98 of FIG. 8. At step 98, a determination is made as to whether the first data is received. If not, the process proceeds to step 100 where processing of the first memory operation is stalled for a pipeline cycle. At some subsequent pipeline cycle, the data will be received and written into the first data register. Note that the stalling of the first transaction, which results from waiting a read transaction to be fulfilled, does not affect the pipeline processing of subsequent transactions.

If the hit message was generated for the second memory operation, the process proceeds to step 102 of FIG. 8. At step 102, a determination is made as to whether the second data register is available. If not, the processing of the second memory operation is stalled for a pipeline cycle. The stalling of the second memory operation occurs on a pipeline cycle by pipeline cycle basis until the second data register is available. When the second data register is available, the process proceeds to step 106 where the second data is written to the second data register. Once the second data is written to the second data register, the processing of the second memory operation is complete.

If, however, a miss message was generated for the second memory operation, the process proceeds to step 108. At step 108, a read command is issued for the second data. The processing of steps 98 and 100 and 102 through 108 occur during a seventh pipeline cycle.

For the second memory operation, the process proceeds to step 110 where a determination is made as to whether the second data has been received. If not, the process proceeds to step 112 where the processing of the second memory operation is stalled for a pipeline cycle. When the second data is received at a subsequent cycle, the second data is written to the second data register.

By processing memory operations in accordance with the method of FIGS. 6 through 8, a miss message does not stall the entire pipeline process. The stalling of the pipeline process only occurs when a dependency arises between two transactions. Alternatively, the stalling of the pipeline process may be limited to only the dependent transaction. As such, when the second transaction had a miss command issued, the first memory operation proceeded without impact. Conversely, the first memory operation proceeded without impact when the second memory operation generated the miss message. Thus, by allowing miss messages to be recorded and subsequently processed, out of order writing the data to the data registers can occur. This out-of-order processing allows for more efficient utilization of the pipeline process and minimizes stalling. As one of average skill in the art will appreciate, when the pipeline process is stalled due to the unavailability of an address register or data register, the corresponding pipeline cycles are increased. For example, on FIG. 6, during the second cycle, if the first address register is not available, the pipeline is stalled at the second cycle. The stalling on a cycle by cycle basis continues until the first address register is available. Once the address register is available the entire process then proceeds to the next cycle. As such, the second cycle, if stalling occurs, may include a plurality of cycles. A similar result occurs during the third cycle with respect to the second memory operation, the sixth cycle with respect to the second memory operation, the sixth cycle with respect to the first memory operation and the seventh cycle with respect to the second memory operation. Alternatively, if only the dependent transaction is stalled, the other transactions are not stalled unless they encounter a dependency.

Figure 9:
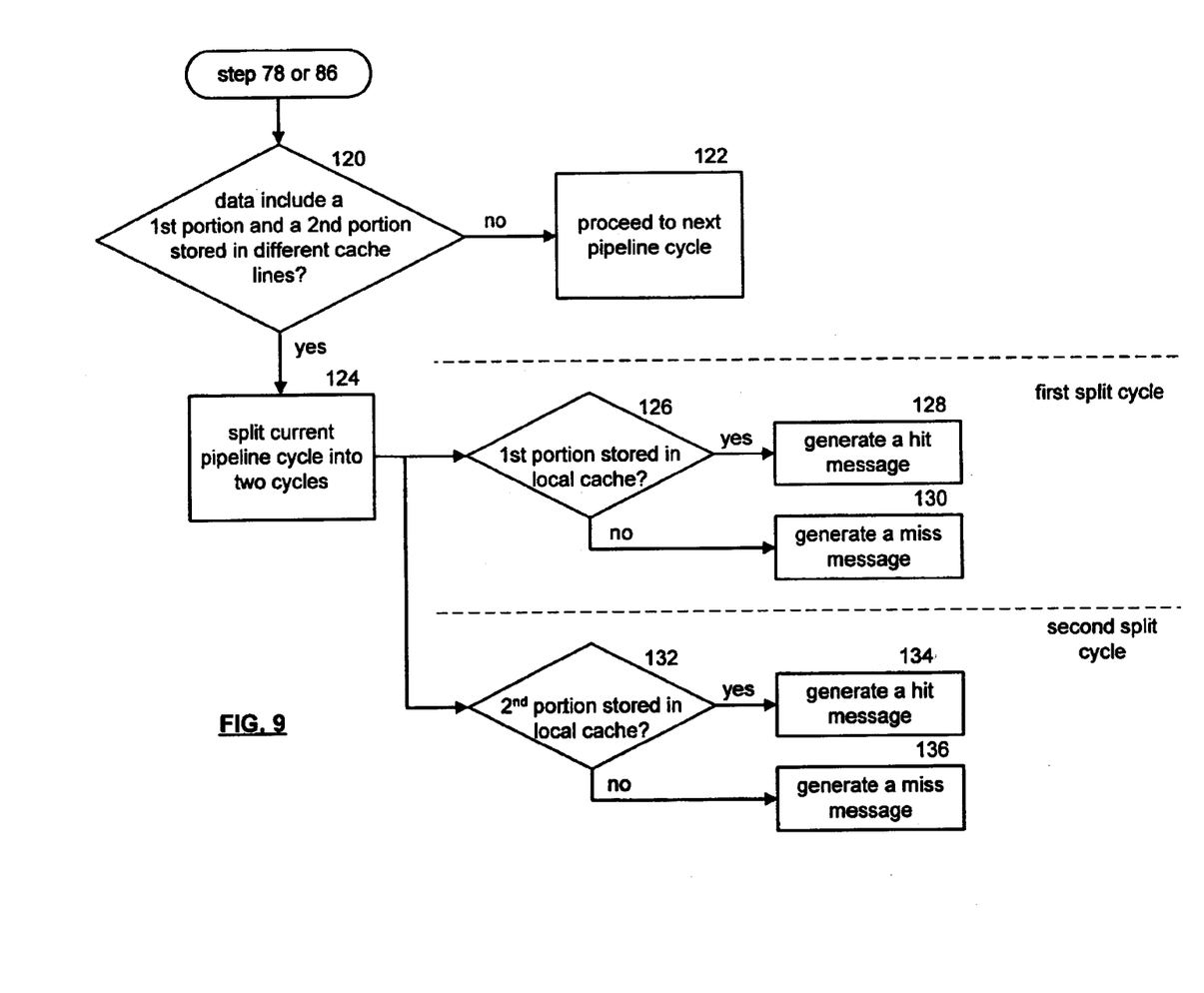
FIG. 9 illustrates a logic diagram of additional processing for steps 78 or 86 of the logic diagram of FIGS. 6 through 8.

FIG. 9 illustrates a logic diagram of a method for processing steps 78 or 86 of the method illustrated in FIGS. 6 through 8. The process begins at step 120 where a determination is made as to whether the data includes a first portion and a second portion which are stored in different cache lines. Such a situation arises because the cache line allows for misaligned load operations. As such, a portion of the operation may end up in one cache line while the remaining portion ends up in a second cache line.

If the data does not include two portions, the process proceeds to step 122. At step 122 the process proceeds to the next pipeline cycle. If, however, the data includes two portions stored in different cache lines, the process proceeds to step 124. At step 124, the current pipeline cycle is split into two cycles. As such, each of the portions of the data is treated as a separate data transaction. For the first portion of the data, the process proceeds to step 126 where a determination is made as to whether the first portion is stored in local cache. If yes, the process proceeds to step 128 where the hit message is generated. If not, the process proceeds to step 130 where a miss message is generated. For the second portion of the data, the process proceeds to step 132 where a determination is made as to whether the second portion is stored in local cache. If so, a hit message is generated at step 132. If not, the process proceeds to step 136 where a miss message is generated. Note that both pieces of the data need to be received before continuing the pipeline process for the split transaction.

Figure 10:
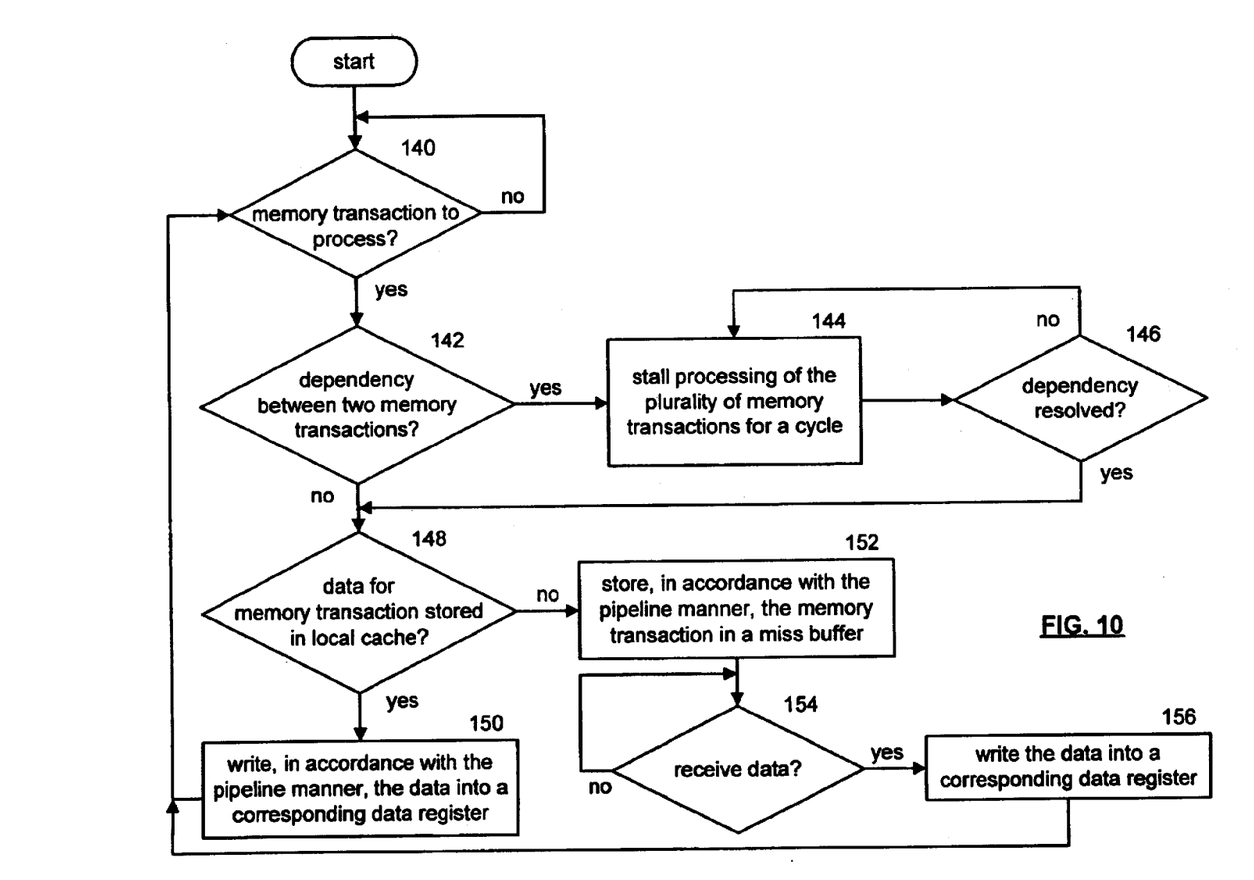
FIG. 10 illustrates a logic diagram of an alternate method for out-of-order memory processing within an in-order processing device in accordance with the present invention.

FIG. 10 illustrates a logic diagram of an alternate method for out-of-order memory processing within an in-order processing device. The process begins at step 140 where a determination is made as to whether a memory transaction is to be processed. This occurs for each of a plurality of memory transactions. Note that a memory transaction may be a memory instruction transaction and/or a memory data transaction.

If there is a memory transaction to be processed, the process proceeds to step 142 where a determination is made as to whether a dependency exists between two or more transactions. A dependency arises when a subsequent memory, or non memory, transaction is addressing a register within the register file that is allocated to a pending preceding memory transaction. In addition, a dependency may arise when one transaction needs data from another transaction. If a dependency arises, the processes proceeds to step 144 where the processing of the plurality of memory transactions is stalled for a pipeline cycle. The process then proceeds to step 146 where a determination is made as to whether the dependency has been resolved. If not, the process repeats at step 144 and 146 until the dependency is resolved.

Once the dependency has been resolved, or a dependency does not exist, the process proceeds to step 148. At step 148 a determination is made as to whether data for a given memory transaction is stored in local cache. If so, the process proceeds to step 150 where the data is written into the corresponding data register in accordance with the pipeline manner. Having done this, the process repeats at step 140 for subsequent memory transactions.

If, however, the data is not stored in local cache, the process proceeds to step 152. At step 152 the memory transaction is stored in a miss buffer in accordance with the pipeline manner. The process then proceeds to step 154 where a determination is made as to whether the data has been received. Once the data is received, the process proceeds to step 156 where the data is written into the corresponding data register. Having done this, the process repeats at step 140. Note that if processing steps 152 through 154 are performed for a given transaction, this does not impact the processing of other transactions. As such, while steps 152 through 154 are being performed for one transaction, a plurality of other transactions may proceed through steps 140 through 150.

The preceding discussion has presented a method and apparatus for out-of-order memory processing within an in-order processor. By utilizing the teachings of the present invention misses of data being stored in local cache do not cause the pipeline process to be stalled. By avoiding the stalling of the pipeline process within a central processing unit, the central processing unit functions more efficiently. As one of average skill in the art would readily appreciate, other embodiments may be derived from the teachings contained herein without deviating from the scope of the claims.

What is claimed is:

1. A method for out of order memory processing within an in-order processing device, the method comprises the steps of:

during a first pipeline cycle:
decoding a first memory operation to identify a first data register and a first address register;

during a second pipeline cycle:
reading from the first address register to obtain first addressing information when the first address register is available; and
decoding a second memory operation to identify a second data register and a second address register;

during a third pipeline cycle:
generating a first address from the first addressing information; and
reading from the second address register to obtain second addressing information when the second address register is available;

during a fourth pipeline cycle;
determining whether first data is stored in a local cache based on the first address; and
generating a second address from the second addressing information;

during a fifth pipeline cycle:
generating a hit message when the first data is stored in the local cache;
generating a miss message when the first data is not stored in the local cache;
determining whether second data is stored in the local cache based on the second address;

during a sixth pipeline cycle:
writing the first data to the first data register when the first data is stored in the local cache;
storing the first memory operation in a miss buffer when the first data is not stored in the local cache;
generating a second hit message when the second data is stored in the local cache;
generating a second miss message when the second data is not stored in the local cache;

during a seventh pipeline cycle:
writing the second data to the second data register when the second data is stored in the local cache;
storing the second memory operation in the miss buffer when the second data is not stored in the local cache;

during at least one subsequent pipeline cycle:
writing the first data to the first data register when the first data is retrieved from system cache or system memory;
writing the second data to the second data register when the second data is retrieved from the system cache or the system memory; and the method further comprises:
during the second pipeline cycle,
stalling the reading from the first address register until the first address register is available, wherein the stalling results in at least one pipeline cycle passing without reading from the first address register; and
resuming, at the fourth pipeline cycle, the generating of the first address when the first address register becomes available.

2. The method of claim 1 further comprises, during the third pipeline cycle, stalling the reading from the second address register until the second address register is available, wherein the stalling the reading from the second address register results in at least one pipeline cycle passing without reading from the second address register; and
resuming, at the fifth pipeline cycle, the generating of the second address when the second address register becomes available.

3. The method of claim 1 further comprises, during the sixth pipeline cycle,
stalling the writing of the first data until the first data register is available, wherein the stalling the writing results in at least one pipeline cycle passing without writing to the first data register; and
resuming the writing of the first data into the first data register when the first data register becomes available.

4. The method of claim 1 further comprises, during the seventh pipeline cycle,
stalling the writing of the second data until the second data register is available, wherein the stalling the writing results in at least one pipeline cycle passing without writing to the second data register; and
resuming the writing of the second data into the second data register when the second data register becomes available.

5. The method of claim 1 further comprises:
during the fourth pipeline cycle,
determining the first data includes a first portion that is stored in one line of the local cache memory and a second portion that is stored in another line of the local cache memory;
splitting the fourth pipeline cycle into two pipeline cycles;
during one of the two pipeline cycles, determining whether the first portion is stored in the local cache; and
during a subsequent one of the two pipeline cycles, determining whether the second portion is stored in the local cache;
during the fifth pipeline cycle,
splitting the fifth pipeline cycle into a first portion pipeline cycle and a second portion pipeline cycle;
during the first portion pipeline cycle,
generating a hit message when the first portion is stored in the first local cache;
generating a miss message when the first portion is not stored in the first local cache;
during the second portion pipeline cycle,
generating a hit message when the second portion is stored in the second local cache;
generating a miss message when the second portion is not stored in the second local cache.

6. The method of claim 1 further comprises:
during the fifth pipeline cycle,
determining the second data includes a first portion that is stored in one line of memory and a second portion that is stored in another line of the memory;

splitting the fifth pipeline cycle into two pipeline cycles;
during one of the two pipeline cycles, determining whether the first portion is stored in the first local cache; and
during a subsequent one of the two pipeline cycles, determining whether the second portion is stored in the second local cache;
during the sixth pipeline cycle,
splitting the sixth pipeline cycle into a first portion pipeline cycle and a second portion pipeline cycle;
during the first portion pipeline cycle,
generating a hit message when the first portion is stored in the first local cache;
generating a miss message when the first portion is not stored in the first local cache;
during the second portion pipeline cycle,
generating a hit message when the second portion is stored in the second local cache;
generating a miss message when the second portion is not stored in the second local cache.

7. The method of claim 1 further comprises, during the at least one subsequent pipeline cycle:
writing the first data to the first data register during a first one of the at least one subsequent pipeline cycles;
writing the second data to the second data register during a second one of the at least one subsequent pipeline cycles.

8. The method of claim 1 further comprises, during the at least one subsequent pipeline cycle:
writing the second data to the second data register during a first one of the at least one subsequent pipeline cycles;
writing the first data to the first data register during a second one of the at least one subsequent pipeline cycles.

9. A system for out of order memory processing, the system comprises:
a processing module; and
memory operably coupled to the processing module, wherein the memory includes operational instructions that cause the processing module to:
during a first pipeline cycle:
decode a first memory operation to identify a first data register and a first address register;
during a second pipeline cycle:
read from the first address register to obtain first addressing information when the first address register is available; and
decode a second memory operation to identify a second data register and a second address register;
during a third pipeline cycle:
generate a first address from the first addressing information; and
read from the second address register to obtain second addressing information when the second address register is available;
during a fourth pipeline cycle;
determine whether first data is stored in a local cache based on the first address; and
generate a second address from the second addressing information;
during a fifth pipeline cycle:
generate a hit message when the first data is stored in the local cache;
generate a miss message when the first data is not stored in the local cache;
determine whether second data is stored in the local cache based on the second address;
during a sixth pipeline cycle:
write the first data to the first data register when the first data is stored in the local cache;
store the first memory operation in a miss buffer when the first data is not stored in the local cache;
generate a second hit message when the second data is stored in the local cache;
generate a second miss message when the second data is not stored in the local cache;
during a seventh pipeline cycle:
write the second data to the second data register when the second data is stored in the local cache;
store the second memory operation in the miss buffer when the second data is not stored in the local cache;
during at least one subsequent pipeline cycle:
write the first data to the first data register when the first data is retrieved from system cache or system memory;
write the second data to the second data register when the second data is retrieved from the system cache or the system memory; and
wherein the memory further comprises operational instructions that cause the processing module to:
during the second pipeline cycle,
stall the reading from the first address register until the first address register is available, wherein the stalling results in at least one pipeline cycle passing without reading from the first address register; and
resume, at the fourth pipeline cycle, the generating of the first address when the first address register becomes available.

10. The system of claim 9, wherein the memory further comprises operational instructions that cause the processing module to:
during the third pipeline cycle, stall the reading from the second address register until the second address register is available, wherein the stalling the reading from the second address register results in at least one pipeline cycle passing without reading from the second address register; and
resume, at the fifth pipeline cycle, the generating of the second address when the second address register becomes available.

11. The system of claim 9, wherein the memory further comprises operational instructions that cause the processing module to:
during the sixth pipeline cycle,
stall the writing of the first data until the first data register is available, wherein the stalling the writing results in at least one pipeline cycle passing without writing to the first data register; and
resume the writing of the first data into the first data register when the first data register becomes available.

12. The system of claim 9, wherein the memory further comprises operational instructions that cause the processing module to:
during the seventh pipeline cycle,
stall the writing of the second data until the second data register is available, wherein the stalling the writing results in at least one pipeline cycle passing without writing to the second data register; and
resume the writing of the second data into the second data register when the second data register becomes available.

13. The system of claim 9, wherein the local cache memory further comprises operational instructions that cause the processing module to:
- during the fourth pipeline cycle,
  - determine the first data includes a first portion that is stored in one line of local cache memory and a second portion that is stored in another line of the memory;
  - split the fourth pipeline cycle into two pipeline cycles;
  - during one of the two pipeline cycles, determine whether the first portion is stored in the local cache; and
  - during a subsequent one of the two pipeline cycles, determine whether the second portion is stored in the local cache;
- during the fifth pipeline cycle,
  - split the fifth pipeline cycle into a first portion pipeline cycle and a second portion pipeline cycle; (causes associated tasks of other memory transactions to be delayed one cycle to accommodate the split)
- during the first portion pipeline cycle,
  - generate a hit message when the first portion is stored in the local cache;
  - generate a miss message when the first portion is not stored in the local cache;
- during the second portion pipeline cycle,
  - generate a hit message when the second portion is stored in the local cache;
  - generate a miss message when the second portion is not stored in the local cache.

14. The system of claim 9, wherein the memory further comprises operational instructions that cause the processing module to:
- during the fifth pipeline cycle,
  - determine the second data includes a first portion that is stored in one line of local cache memory and a second portion that is stored in another line of the local cache memory;
  - split the fifth pipeline cycle into two pipeline cycles;
  - during one of the two pipeline cycles, determine whether the first portion is stored in the local cache; and
  - during a subsequent one of the two pipeline cycles, determine whether the second portion is stored in the second local cache;
- during the sixth pipeline cycle,
  - split the sixth pipeline cycle into a first portion pipeline cycle and a second portion pipeline cycle;
- during the first portion pipeline cycle,
  - generate a hit message when the first portion is stored in the local cache;
  - generate a miss message when the first portion is not stored in the local cache;
- during the second portion pipeline cycle,
  - generate a hit message when the second portion is stored in the local cache;
  - generate a miss message when the second portion is not stored in the local cache.

15. The system of claim 9, wherein the memory further comprises operational instructions that cause the processing module to:
- during the at least one subsequent pipeline cycle:
  - write the first data to the first data register during a first one of the at least one subsequent pipeline cycles;
  - write the second data to the second data register during a second one of the at least one subsequent pipeline cycles.

16. The system of claim 9, wherein the memory further comprises operational instructions that cause the processing module to:
- during the at least one subsequent pipeline cycle:
  - write the second data to the second data register during a first one of the at least one subsequent pipeline cycles;
  - write the first data to the first data register during a second one of the at least one subsequent pipeline cycles.

* * * * *